(12) United States Patent
Vezinet et al.

(10) Patent No.: US 6,188,143 B1
(45) Date of Patent: Feb. 13, 2001

(54) SYSTEM FOR SUPPLYING ELECTRICAL ENERGY TO ELECTRICAL APPARATUS

(75) Inventors: Marc Vezinet, Montgeron; Jean Gerard; Claude Blondel, both of Versailles, all of (FR)

(73) Assignee: L'Air Liquide, Societe Anonyme pour l'Etude et l'Exploitation des Procedes Georges Claude, Paris Cedex (FR)

(*) Notice: Under 35 U.S.C. 154(b), the term of this patent shall be extended for 0 days.

(21) Appl. No.: 09/391,651

(22) Filed: Sep. 7, 1999

(30) Foreign Application Priority Data

Sep. 14, 1998 (FR) .................................................. 98 11417

(51) Int. Cl.⁷ ...................................................... H02J 9/08
(52) U.S. Cl. ................................................. 307/43; 307/66
(58) Field of Search .................................. 307/43, 44, 47, 307/64, 65, 66, 67, 68; 290/30 A

(56) References Cited

U.S. PATENT DOCUMENTS 5,821,630 * 10/1998 Schutten ................................ 290/30
5,917,251 * 6/1999 Schermann et al. .................... 307/20
5,994,794 * 11/1999 Wehrlen ................................. 307/66

FOREIGN PATENT DOCUMENTS

| 40 30 134 | 3/1992 | (DE) . |
| 0 539 027 | 3/1990 | (EP) . |
| 0 431 486 | 6/1991 | (EP) . |
| 0 337 863 | 10/1998 | (EP) . |

* cited by examiner

*Primary Examiner*—Josie Ballato
*Assistant Examiner*—Robert L. Deberadinis
(74) *Attorney, Agent, or Firm*—Young & Thompson

(57) ABSTRACT

A system for supplying electrical energy to an electrical apparatus includes devices for generating electrical energy for ensuring the supply of the electrical apparatus, and compensating devices for compensating for disturbances in the supply to the apparatus including a compensation device with an active element for storing active electrical energy, adapted to exchange the active energy with the electrical apparatus upon the appearance of a disturbance.

9 Claims, 3 Drawing Sheets

SYSTEM FOR SUPPLYING ELECTRICAL ENERGY TO ELECTRICAL APPARATUS

FIELD OF THE INVENTION

The present invention relates to a system for supplying electrical energy to an electrical apparatus.

DESCRIPTION OF RELATED ART

In certain applications, in particular in the field of electronics and microelectronics, it is necessary to have a high quality supply.

Such a supply must continuously furnish a very stable frequency, which is to say, for example, with variations less than about 1%, variations of the voltage value less than about 10%, preferably less for example than 8%, and this for a power which can reach for example 30 megawatts.

Moreover, when there is a cutoff or a voltage drop in the supply, the latter must not be translated into a variation of frequency and of voltage beyond fixed limits.

Thus, the public electric energy distribution networks, adapted to suffer micro-interruptions of a duration of 100 to 800 ms, accompanying a drop in supply voltage value, do not permit providing a suitable supply for such installations.

SUMMARY OF INVENTION

The object of the invention is to provide a supply system capable of a high quality supply, which is to say capable of responding to the emergencies mentioned above.

It therefore has for its object a system of supplying electrical energy to at least one electrical apparatus connected to a supply line connected to a network for the distribution of electrical energy, comprising moreover at least one electrical energy generator connected to the line and, interposed between the network and the line, means for compensating disturbances in the supply furnished to the apparatus, the compensation means comprising means for storing active electrical energy adapted to exchange the active electrical energy with the electrical apparatus, upon the appearance of a disturbance.

The supply system according to the invention can moreover comprise one or several of the following characteristics, taken alone or in any technically possible combinations:

- the energy storage means comprise at least one rotating mass associated with reversible conversion means of mechanical energy into electrical energy, connected to a supply line of the apparatus;
- the system comprises moreover frequency converter means associated with the energy storage means;
- moreover it comprises means for reversibly converting an active power delivered by the energy storage means into active power adapted to be exchanged with the apparatus;
- the system moreover comprises at least one voltage-increasing transformer connected between the supply line to the electrical apparatus and the energy storage means.

Other characteristics and advantages will become apparent from the following description, given solely by way of example and with reference to the accompanying drawings, in which:

DETAILED DESCRIPTION OF THE INVENTION

Figure 1:
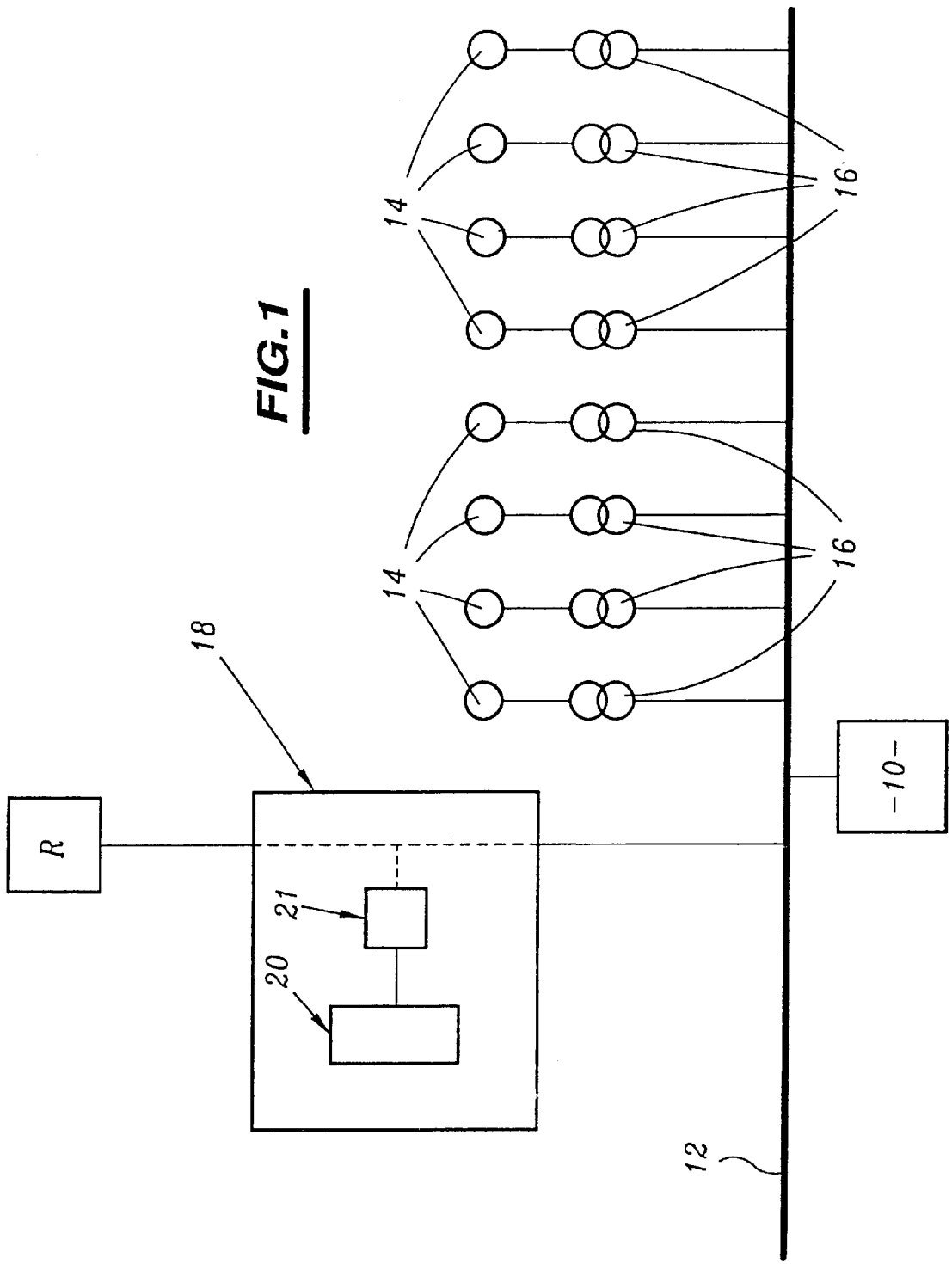
FIG. 1 is a general schematic view of a supply system according to the invention.

In FIG. 1, there is shown a general view of a supply system, according to the invention. It is adapted to supply one or several electrical apparatus, designated by the general reference numeral 10.

Within the scope of the present description, there is meant by electrical apparatus any type of device or installation that consumes electrical energy, such as electronic power devices, motors, . . .

As mentioned above, the installation 10 must be supplied by means of a high quality supply, which is to say having a stable frequency, with variations for example less than about 1%, voltage variations for example less than 10%, preferably less than 8% and without tension drops that can appear in the presence of micro-interruptions or a short circuit of an electrical energy distribution network.

For example, the voltage to be supplied to apparatus 10 is several tens of KV, for a power of several tens of megawatts.

As seen in FIG. 1, the supply system comprises a supply line 12 connected to a network R for the distribution of polyphase electrical energy, of the type of a public distribution network, and to which are connected an assembly of electrical energy generators, such as 14, constituted for example by turbines or suitable gas motors.

The number of generators 14 used depends on the needs of the apparatus 10, which is to say the total power to be supplied, the power of each generator, and the impact of maximum permissible load, which is to say the variation of frequency arising upon electrical connection of the apparatus 10.

For example, for generators 14 each delivering a power of 3.8 megawatts, eight identical generators 14 are used and connected in parallel to the supply line 12, so as to obtain an overall power of about 30 megawatts.

It is further seen in FIG. 1 that each generator 14 is associated with a voltage-raising transformer, such as 16, capable of raising the voltage supply to the line 12 to the level of the voltage to be supplied to the apparatus 10, which is to say to a voltage equal to for example 20 KV.

Moreover, the supply system is provided with compensation means for disturbances that may arise in the supply of the apparatus 10, designated by the general reference numeral 18 and simply shown in this figure.

They are interposed between the network R of electrical energy distribution and the supply line 12.

The compensation means 18 comprise means 20 for storing electrical energy, constituted by a rotating mass associated with means 21 for the reversible conversion of mechanical energy delivered or absorbed by this latter into electrical energy, connected to the supply line 12.

Figure 2:
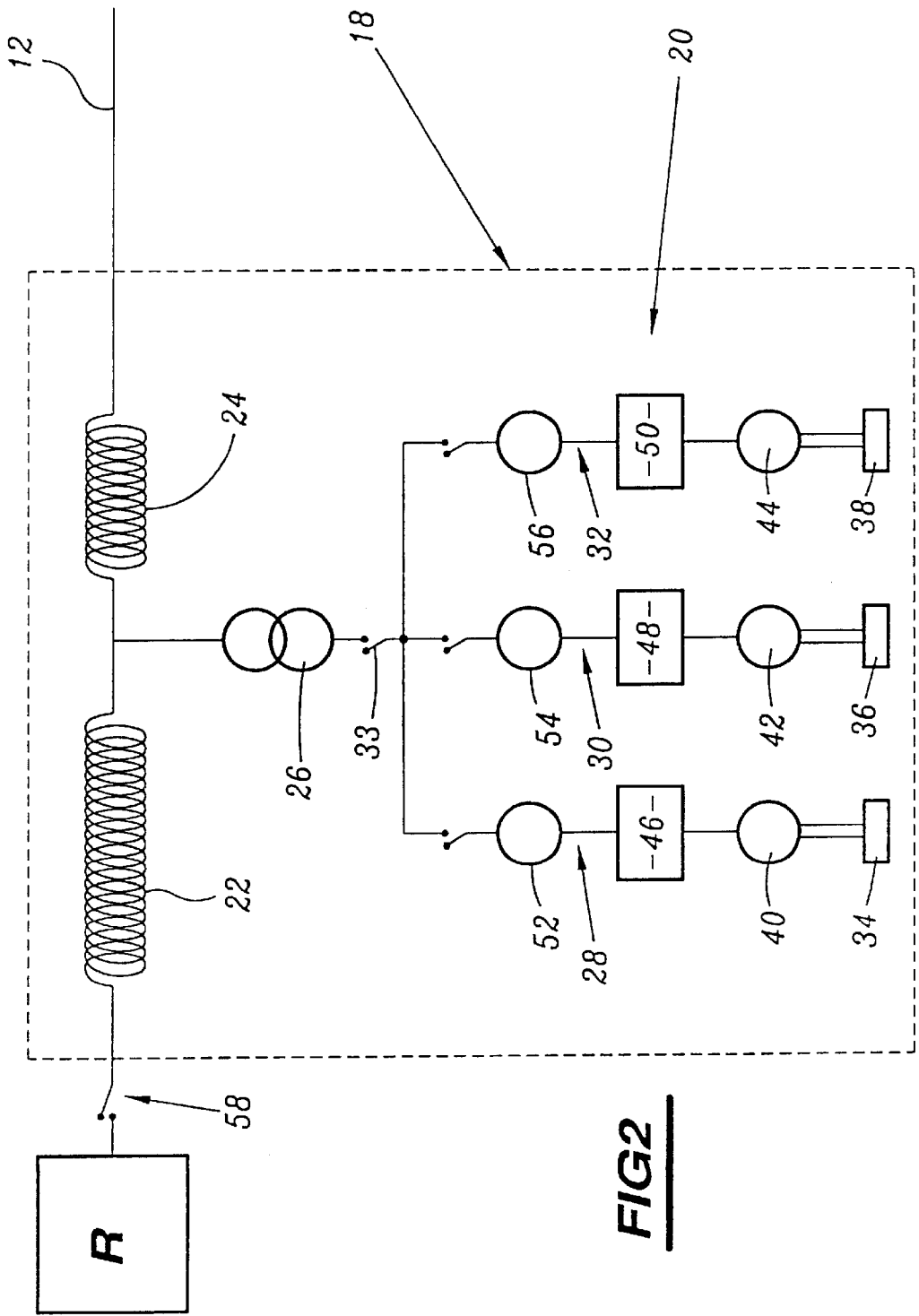
FIG. 2 is an electrical diagram showing the construction of the means for compensating disturbances that may arise in the supply to the apparatus.

In FIG. 2 there is shown a first example of embodiment of the compensation means 18.

It is seen in FIG. 2 that the energy storage means 20 of the compensation means 18 are connected between two inductance windings 22 and 24 connected on the one hand to the network R for the distribution of electrical energy and on the other hand to the supply line 12, to permit the exchange of energy with the electrical apparatus and the network when there arises a disturbance in the supply, for example a micro-interruption generated by the supply circuit R, or a malfunction of one of the generators 14, so as to maintain constant the supply voltage to the apparatus 10.

The means 20 for storing energy are connected to the windings 22 and 24 by means of a voltage raising transformer 26 adapted for example to supply an active power of 5 MW.

They comprise several identical branches 28, 30 and 32 arranged in parallel and connected to the transformer 26 by means of suitable switching devices such as 33.

Each of the branches 28, 30 and 32 is adapted to exchange active power with the electrical apparatus 10 and the network R to compensate disturbances that may arise in the supply of this latter.

To do this, each of the branches 28, 30 and 32 comprises a rotating mass 34, 36 and 38, constituted by a flywheel of conventional type, associated with reversible conversion means of mechanical energy into electrical energy, respectively, 40, 42 and 44, for the conversion on the one hand of the mechanical energy supplied by the flywheels 34, 36 and 38 into electrical energy and, on the other hand, of the electrical energy to be absorbed in the supply line 12 into corresponding mechanical energy for driving in rotation the flywheels.

For example, each of the flywheels is a flywheel capable of delivering an active power equal to 1650 KW for 10 s.

The point of operation of these flywheels is adjusted so as to be positioned in the middle of their operating range, so as to absorb or deliver as desired the active power.

Moreover, they are each associated with motor means (not shown) permitting putting them in rotation, upon starting the system.

The energy converter means 40, 42 and 44 are moreover connected to a frequency converter, respectively 46, 48 and 50, of conventional type, capable of supplying at the output a frequency equal to 50 Hz compatible with the supply frequency of the electrical apparatus 10.

Each of the branches 28, 30 and 32 is moreover completed by a converter 52, 54 and 56, constituted for example by an alternator, capable of transforming the active power supplied by the flywheels 34, 36 and 38 into corresponding active power, for its introduction into the supply line 12 and to transform the active power from this latter into corresponding active power, to be stored in the flywheels.

Three flywheels being used in the envisaged embodiment, it is possible to exchange with the supply line 12 a power equal to about 5 megawatts, which permits overcoming the momentary failure of one of the generators 14 and to limit the impacts due to a micro-cutoff arising in the distribution network R.

When there is a short circuit in the network R, the windings 22 and 24 limit the transmission of electrical energy in the direction of the portion of the responsible portion of the network as long as a circuit breaker 58 conventionally provided in the network R is not actuated, which conventionally intervenes after a period of time that can be up to 500 ms.

As a result, the effects of such a short circuit are limited.

It will be noted that the switching elements, such as 33, provided for the energy storage means, are driven by means of a conventional electronic device whose response time is negligible relative to the response time of the circuit breaker 58, which contributes to limiting the effects of malfunction arising in the network R.

Figure 3:
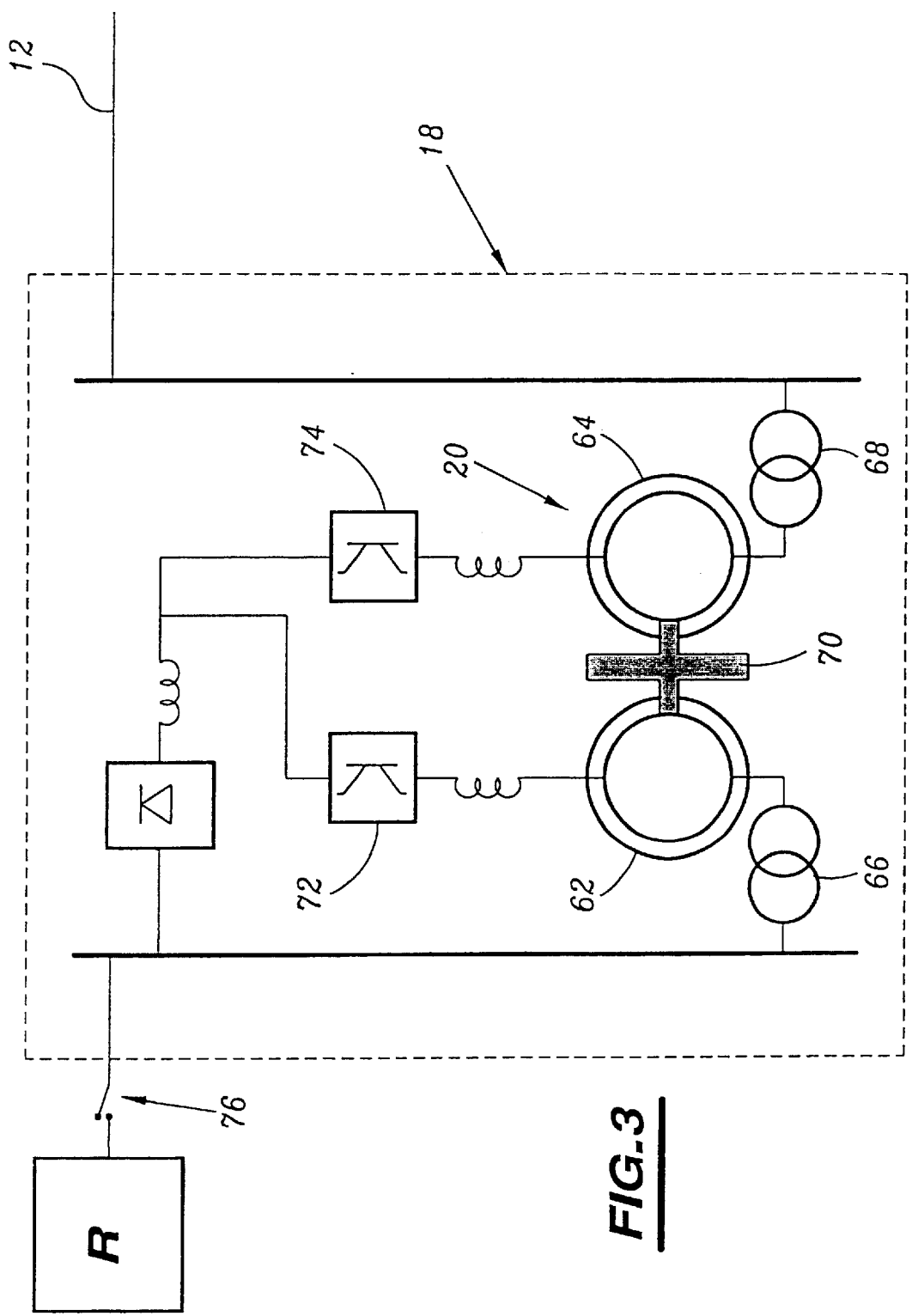
FIG. 3 is an electrical diagram of another embodiment of the compensation means.

Referring to FIG. 3, there will now be described another embodiment of the compensation means 18.

According to this embodiment, the energy storage means 20 are connected between two rotary machines 62 and 64 with a wound rotor connected, one of them, 62, to the electrical energy distribution network R, and the other of them, 64, to the supply line 12, to permit energy exchange with the electrical apparatus and the network when a disturbance arises in the supply, for example a micro-interruption generated by the supply network R, or by malfunction of one of the generators 14.

The rotary machines 62 and 64 are connected to the network R and to the supply line 12 by means of two voltage-raising transformers 66 and 68 adapted for example to supply an active power of 3 MW.

As in the embodiment described with reference to FIG. 2, the compensation means 18 comprise several identical branches disposed in parallel.

Each of the branches is adapted to exchange active power with the electrical apparatus 10 and the network R to compensate for disturbances likely to arise in the supply of this latter.

The energy storage means 20 of each of the branches comprises a common rotating mass 70 for storage of energy, constituted by a flywheel of conventional type, associated with reversible conversion means for mechanical energy into electrical energy, 72 and 74, for the conversion on the one hand of the mechanical energy supplied by the flywheels into electrical energy, and, on the other hand, of electrical energy to be absorbed in the supply line 12 into corresponding mechanical energy for driving the flywheels in rotation.

For example, the flywheel is a flywheel capable of delivering an active power equal to 3000 KW for 3 s.

The energy conversion means 72 and 74 are moreover capable of supplying, at their output, a variable frequency compatible with the frequency of rotation of the flywheel 70.

Two rotary machines being used in the embodiment described, it is possible to exchange with the supply line 12 a power equal to about 6 megawatts, which permits remedying the momentary failure of one of the generators 14 and to limit the impact due to a micro-cutoff arising in the distribution network R, as in the preceding example.

It will moreover be noted that when a short circuit arises in the network R, the rotary machines 62 and 64 limit the transmission of electrical energy in the direction of the responsible portion of the network so long as the circuit breaker 76 provided in the network R is not actuated.

As a result, the effects of such a short circuit are limited.

As in the previous embodiment, the switching elements, provided for the energy storage means, are driven by means of a conventional electronic device whose response time is negligible relative to the response time of the circuit breaker 76, which contributes to limiting the effects of malfunction arising in the network R.

Finally, it will be seen that the system is completed by inductances and a suitable diode bridge for the use that is foreseen.

It will be seen that the invention which has been described, ensuring energy exchange between storage means 20 and supply line 12, permit compensating the voltage drops adapted to arise upon the appearance of a malfunction in the network R, or upon failure of one of the generators 14, or again during a momentary voltage drop due to the connection of an apparatus to line 12, to the extent that the compensation means 18 permit introducing the quantity of energy necessary to overcome this failure.

It will also be noted that the absorption and introduction of load in supply line 12 permits maintaining stable the frequency of supply upon a malfunction arising.

The supply system described with reference to FIGS. 1 and 2 is provided with energy storage means constituted principally by the flywheels.

It will nevertheless be possible, as a modification, to replace these flywheels by other types of suitable storage means, such as for example electrical energy accumulators.

Finally, it will be noted that the invention is not limited to the embodiments described, particularly as to the construction of the compensation means, other suitable devices being also usable.

What is claimed is:

1. A system for providing electrical power to at least one user apparatus, comprising:
    at least one power supply line, to which a user apparatus is connected;
    at least one electrical generator connected to the power supply line; and
    a power supply network connected to the power supply line via at least one connection circuit, the connection circuit including a compensating means for compensating for a disturbance in the supply of electrical power to the user apparatus and comprising at least one active electrical energy storage device adapted to exchange active electrical energy with the user apparatus upon appearance of the disturbance.

2. The system of claim 1, wherein the connection circuit further comprises:
    a frequency converter associated with the energy storage device; and
    at least one rotary mass associated with the frequency converter for reversible conversion between mechanical energy and electrical energy.

3. The system of claim 1, wherein the connection circuit further comprises at least one voltage-raising transformer connected between the energy storage device and the power supply line.

4. The system of claim 1, wherein the connection circuit further comprises a frequency converter associated with the energy storage device.

5. The system of claim 4, further comprising at least one rotary mass, associated with the frequency converter, for reversible conversion between mechanical energy and electrical energy.

6. The system of claim 4, wherein the connection circuit further comprises at least one voltage-raising transformer connected between the energy storage device and the power supply line.

7. The system of claim 4, wherein the connection circuit further comprises at least one pair of rotary machines coupled to a single rotary mass.

8. A system for providing electrical power to at least one user apparatus, comprising:
    at least one local power supply line, to which power supply line a user apparatus is connected;
    at least two on-site electrical generators connected in parallel to the power supply line;
    a power supply network connected to the power supply line via at least one connection circuit, the connection circuit including a compensating means for compensating for a disturbance in the supply of electrical power to the user apparatus and comprising at least one active electrical energy storage device adapted to exchange active electrical energy with the user apparatus upon appearance of the disturbance.

9. The system of claim 8, wherein the connection circuit further comprises two serially arranged inductance windings establishing direct connection between the power supply network and the power supply line.

* * * * *